United States Patent
Peoples

(10) Patent No.: US 9,439,413 B2
(45) Date of Patent: Sep. 13, 2016

(54) BUCK GRUNT DEER CAN CALL

(71) Applicant: Paul Peoples, Ardmore, AL (US)

(72) Inventor: Paul Peoples, Ardmore, AL (US)

( * ) Notice: Subject to any disclaimer, the term of this patent is extended or adjusted under 35 U.S.C. 154(b) by 0 days.

(21) Appl. No.: 14/935,163

(22) Filed: Nov. 6, 2015

(65) Prior Publication Data

US 2016/0227759 A1    Aug. 11, 2016

Related U.S. Application Data

(60) Provisional application No. 62/114,681, filed on Feb. 11, 2015, provisional application No. 62/114,686, filed on Feb. 11, 2015.

(51) Int. Cl.
*A01M 31/00* (2006.01)
*A63H 3/31* (2006.01)

(52) U.S. Cl.
CPC .................. *A01M 31/004* (2013.01)

(58) Field of Classification Search
CPC .... A01M 31/00; A01M 31/004; A63H 3/00; A63H 3/31; A63H 5/00

USPC ....... 446/188, 192, 193, 197, 207, 213, 300, 446/397, 216, 416

See application file for complete search history.

(56) References Cited

U.S. PATENT DOCUMENTS

| | | | |
|---|---|---|---|
| 4,888,903 A | 12/1989 | Knight et al. | |
| 5,964,054 A | 10/1999 | Galfidi, Jr. | |
| 5,975,978 A | 11/1999 | Hall | |
| 6,053,793 A * | 4/2000 | Green | A01M 31/004 446/188 |
| 6,053,794 A | 4/2000 | Weiser | |
| 6,120,341 A | 9/2000 | Hafford | |
| 6,575,804 B1 | 6/2003 | Primos | |
| 6,902,463 B2 | 6/2005 | Vaicunas et al. | |
| 7,785,166 B1 * | 8/2010 | Kirby | A01M 31/004 446/176 |
| 7,927,172 B1 | 4/2011 | Kirby et al. | |
| 8,602,834 B2 | 12/2013 | Natale | |
| 2005/0079789 A1 * | 4/2005 | Bishop | A01M 31/004 446/207 |
| 2006/0246815 A1 | 11/2006 | Simone | |
| 2007/0155282 A1 | 7/2007 | De Sousa | |
| 2008/0274666 A1 | 11/2008 | Weider | |

* cited by examiner

*Primary Examiner* — Kien Nguyen
(74) *Attorney, Agent, or Firm* — Cynthia R. Wright

(57) ABSTRACT

The present invention relates to an animal can call used for hunting. The can call makes a noise simulating a deer buck grunt call when inverted.

6 Claims, 7 Drawing Sheets

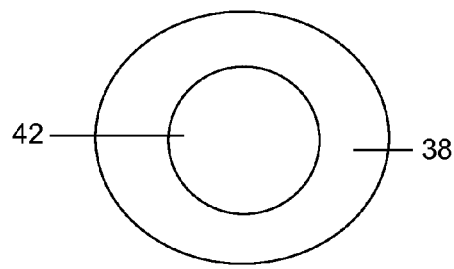
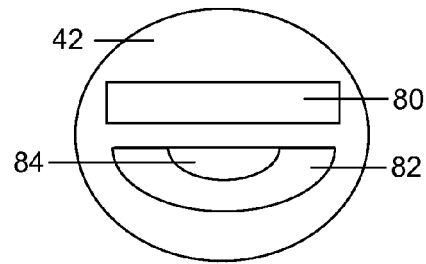
FIG. 5A  FIG. 5B
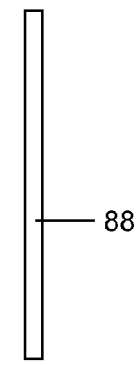
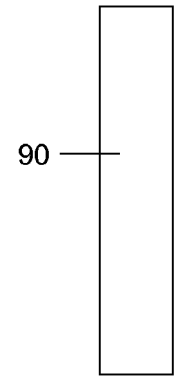
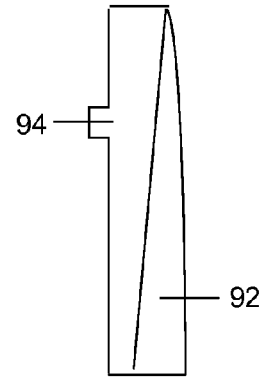
FIG. 5C  FIG. 5D  FIG. 5E  FIG. 5F
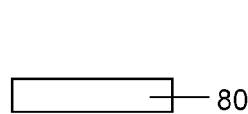
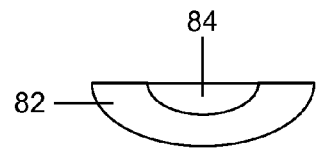
FIG. 5G  FIG. 5H
FIG. 5

BUCK GRUNT DEER CAN CALL

CROSS-REFERENCE TO RELATED APPLICATIONS

This application claims priority to U.S. Provisional Patent Application Nos. 62/114,681 and 62/114,686, both of which were filed on Feb. 11, 2015, the contents of both of which are expressly incorporated by reference herein.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable.

STATEMENT REGARDING PRIOR DISCLOSURES BY THE INVENTOR OR JOINT INVENTORS

The inventor did not disclose the invention herein prior to the 12-month period preceding the filing of his provisional application.

BACKGROUND OF THE INVENTION (1) Field of the Invention.

The present invention relates generally to an animal can call that produces a noise that simulates a deer buck grunt call. The buck grunt noise is produced when the can call is rotated to an inverted position. Once the inverted can call is returned to an upright position, it can be inverted to again produce a deer buck grunt noise.

(2) Description of Related Art.

Numerous devices are known in the relevant art for use by hunters and others for producing game and/or predator calls and sounds in order to attract game, such as moose, elk, deer, waterfowl and wild turkey. These devices are known as game and/or predator calls and are widely commercially available. Many of these devices require a hunter to physically manipulate the position of the call or to manipulate the call itself.

Can-shaped calls are often used to attract deer and other game. Nick Natale (U.S. Pat. No. 8,602,834 B2) discloses a cylindrical, can-shaped can call that produces a game-attracting sound when the call is rotated from an upright position to an inverted position. The can call must be rotated 180° back to its upright position before being rotated upside down to repeat the call noise. A number of deer can calls are sold commercially, including but not limited to, Primos® "THE Original CAN" estrus bleat can call, Primos® "THE Lil' CAN" beat can call, and HUNTER'S SPECIALTIES'® adult doe estrus beat can call. Each of these can calls require a hunter holding the can call to manually rotate the call from an upright position to an inverted position to produce the game-attracting sound and to manually rotate the call from an inverted position to an upright position before repeating the call noise. Each of the deer can calls in the prior art produces a doe noise. None of the deer can calls in the prior art is able to produce the sound of a deer buck grunting.

BRIEF DESCRIPTION OF THE SEVERAL VIEWS OF THE DRAWINGS

FIG. 5A illustrates a bottom view of the "T" stopper of the circular weight member and FIG. 5B shows an bottom view of the internal compartment within the "T" stopper.

FIGS. 5C and 5D illustrates a front and side view of the reed member, respectively.

FIGS. 5E and 5F show a front and side view of the reed support member.

FIG. 5G is a top view of the reed and FIG. 5H is a top view of the reed support member.

DETAILED DESCRIPTION OF THE INVENTION

Figure 1:
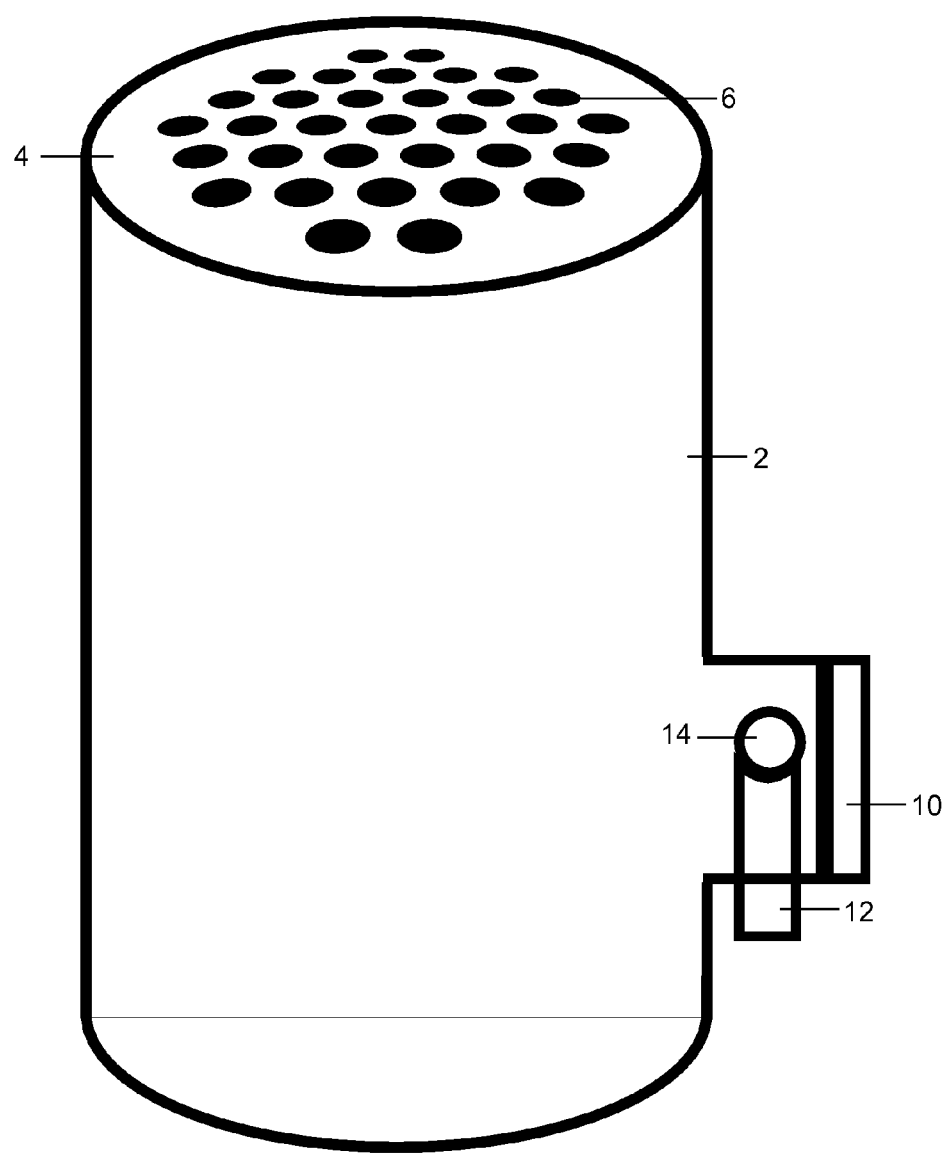
FIG. 1 illustrates a angled top and side view of the Deer Buck Grunt Call.

The present invention comprises, in one form thereof, a can call that produces a noise that simulates a deer buck grunt call. This call attracts deer to a particular area for hunting or wildlife observation. While this invention is susceptible of embodiment in many different forms, there are shown in the drawings and will herein be described in detail, several embodiments with the understanding that the present disclosure should be considered as an exemplification of the principles of the invention and is not intended to limit the invention to the embodiments so illustrated. Further, to the extent that any numerical values or other specifics of materials, et., are provided herein, they are to be construed as exemplifications of the inventions herein, and the inventions are not to be considered as limited thereto.

The following description and drawings are illustrative and are not to be construed as limiting. Numerous specific details are described to provide a thorough understanding of the disclosure. However, in certain instances, well-known or conventional details are not described in order to avoid obscuring the description. References to one, or an, embodiment in the present disclosure can be, but not necessarily are, references to the same embodiment; and, such references mean at least one of the embodiments.

Reference in this specification to "one embodiment' or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a ter; the scope and meaning of a term is the same, in the same context, whether or not it is highlighted. It will be appreciated that the same thing can be said in more than one way.

Consequently, alternative language and synonyms may be used for any ne or more of the terms discussed herein, or is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the disclosure or of any exemplified ter. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

Figure 2:
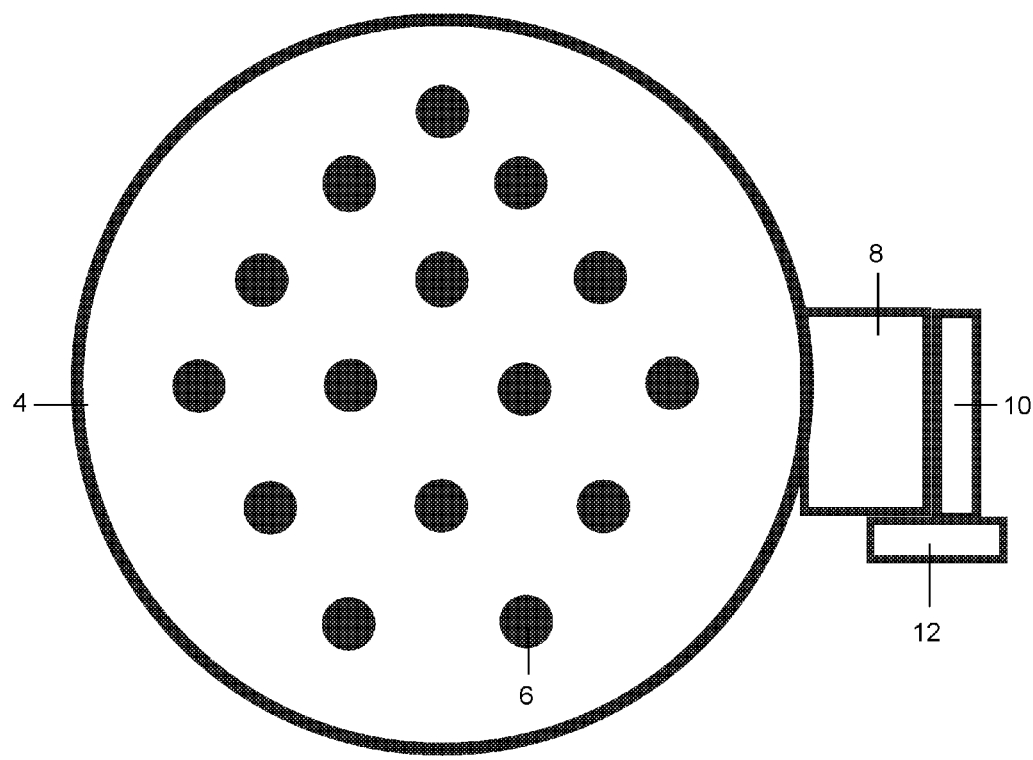
FIG. 2 depicts a top view of the Deer Buck Grunt Call.

The Deer Buck Grunt Call produces the noise of a deer buck grunt call to attract wild game to the location of said call. The noise is produce when a user inverts the device from an upright position to an inverted position. The device must be returned to the upright position before it can produce a second call noise. FIG. 1 shows an exterior, side view of the Deer Buck Grunt Call. Body 2 has the circular shape of a can good. Body 2 is hollow with a top 6 and bottom 20. Body 2 may be composed of acrylonitrile butadiene styrene or any suitable material that is resistant to wear and tear, is lightweight, and resists environment conditions, such as rain and sleet. Body 2 contains within it all parts necessary to produce a noise simulating a deer buck grunt call when it is inverted from an upright position. Body 2 may include arm 10 to attach the device to a robotic, mechanical device that remotely inverts body 2 to produce the deer buck grunt noise. Arm 10 may include locking mechanism 12 that rotates about pin 14 to secure the Deer Buck Grunt Call into a robotic, mechanical device to remotely operate the call. Top 4 contains a number of openings 6 that allow sound produced by the device to be emitted so that it can be heard by wild game. FIG. 2 shows a top, exterior view of the Deer Buck Grunt Call. Arm member 8 attaches body 2 to arm 10 providing a location for a user to grip the device.

Figure 3:
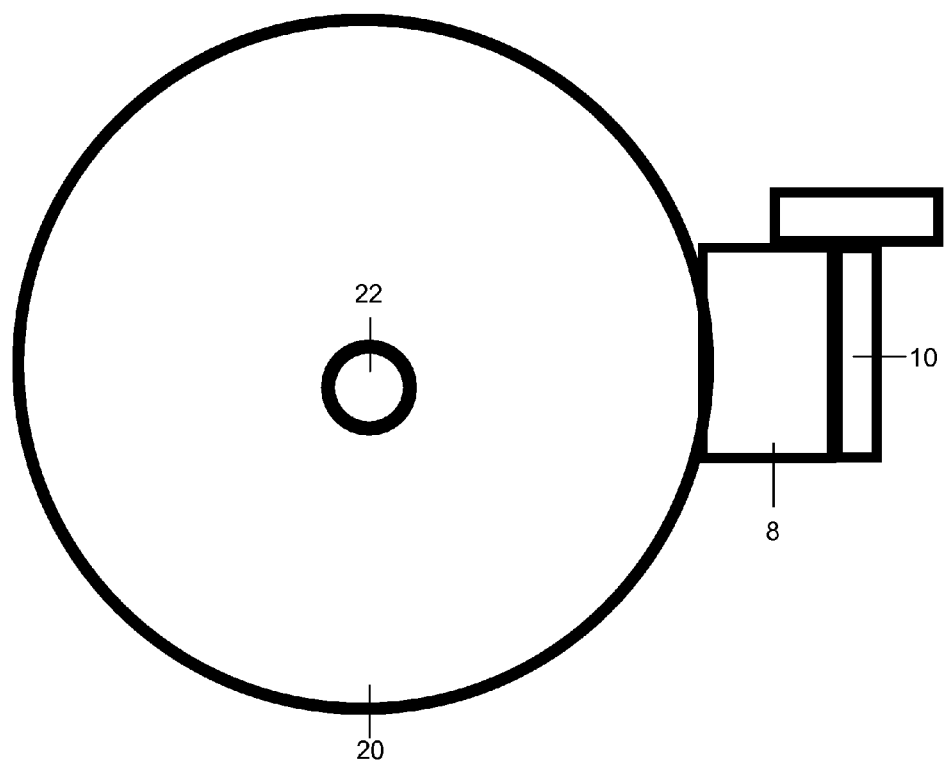
FIG. 3 depicts a bottom view of the Deer Buck Grunt Call.

FIG. 3 shows a bottom, exterior view of the device. Bottom 20 may include dimple 22 that assists the installation of the device into a robotic, mechanical device to remotely operate the can call.

Figure 4:
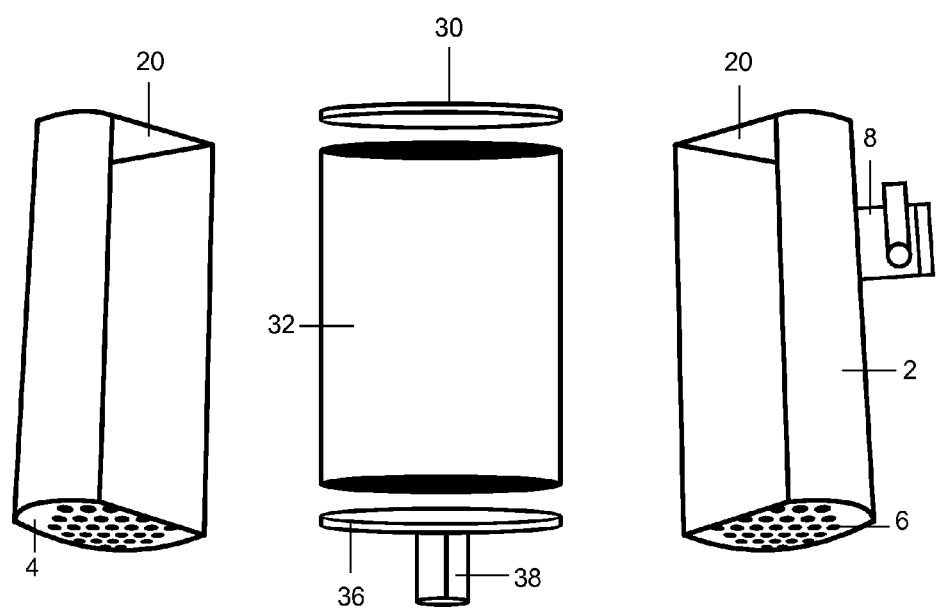
FIG. 4 depicts the outer case of the Deer Buck Grunt Call cut in half and pulled away from the inner mechanism.

Contained within body 2 is the mechanism that makes the deer buck grunt noise. FIG. 4 illustrates the body 2 cut in half so that the exterior portion of the mechanism is seen. FIG. 4 illustrates the invention in an inverted position before the deer buck grunt noise has been produced. The noise mechanism may include cloth body 32, which expands and contracts with the movement of air into and out of the mechanism via openings 4. Cloth body 32 may be composed of Tyvek® or any other suitable material that is durable, impervious to the flow of air, expands and contracts readily, resistant to mold growth, and is resistant to environmental conditions, such as rain and sleet. Cloth body 32 is formed into an interior, circular air chamber. Circular weight 30 is attached to the bottom end of cloth body 32. Circular weight 30 may be composed of hard plastic, metal, or any suitable substance that is rigid, durable, and resistant to environmental conditions. Circular weight 30 is round and of the appropriate size to move up and down the length of body 2 without rubbing against the inner walls of body 2. Circular weight 30 is of sufficient weight to cause cloth body 32 to fill with air and expand to its maximum length when the device is returned to its upright position from an inverted position. Circular weight 30 is of sufficient weight to cause cloth body 32 to deflate, pushing the air from cloth body 32 when inverted.

Inner top plate 36 forms the top of cloth body 32 Inner top plate 36 is composed of hard plastic, metal, or any suitable substance that is rigid, durable, and resistant to environmental conditions Inner top plate 36 includes a cavity positioned in its center that forms a channel for air to pass in and out of cloth body 32 via "T" stopper 38. "T" stopper 38 is composed of hard plastic, metal, or any suitable substance that is rigid, durable, and resistant to environmental conditions. "T" stopper 38 is a hollow channel that contains one or more reeds (shown in FIGS. 5A through 5H) that produce the deer buck grunt noise.

Both circular weight 30 and inner top plate 36 are attached to cloth body 32 via glue or other suitable material that creates a permanent, airtight bond. The weight of circular weight 30 and inner top plate 36 may be varied to vary the noise produced by the device.

FIGS. 5A through 5H show the reed mechanism that is fully contained within "T" stopper 38. FIG. 5A depicts the top of "T" stopper 38 which includes channel 42 that contains the reed mechanism. Channel 42 may be ribbed (not shown) to assist in the movement of air across reed 80 and out channel 42 during inversion of the device. FIG. 5B depicts the inside of the top of "T" stopper 38. Reed 80 and the top of reed stop 82, which includes flat half-circular top 84, aligned within channel 42 so that reed 80 is parallel to reed stop 82. The front 86, side 88, and top 80 of the reed are shown in FIGS. 5C, 5D, and 5G, respectively. Reed 80 is composed of wood, plastic or other suitable material such as duralar or mylar. The preferred embodiment includes a plastic reed that is flexible and vibrates easily with the movement of air through channel 42. The front 90, sculpted side 92 and one or more back stop 94, and top 82 and 84 of reed stop are shown in FIGS. 5E, 5F, and 5H, respectively. Reed stop (82, 84, 90, 92, and 94) are composed of a flexible plastic. Reed stop side 92 includes one or more backstops 94 that push against channel 42 when reed 80 is vibrating against reed stop sculpted side 92. Top 82 of reed stop is sculpted down to reed stop side 92. Reed 80 vibrates against flat half-circular top 84 when air moves through channel 42. Reed 80 and reed stop front 90 may be of equal width. Reed 80 may be slightly longer than reed stop 90 extending past flat half-circular top 84.

When the Deer Buck Grunt Call is in the upright position, circular weight 30 is positioned along bottom 20 and cloth body 32 is full of air. When the Deer Buck Grunt Call is inverted, circular weight 30 pushes air from cloth body 32 into channel 42, over reed 80, which vibrates against reed front 90, flat half-circular top 84, and top 84 of the reed stop, causing the reed backstop 94 to push against "T" stopper 38, which forces the air exiting channel 42 to be expelled through openings 4 producing a noise that simulates a deer buck grunt call that would be heard in nature. The noise produced by the Deer Buck Grunt Call can be altered by changing the weight and size of reed 80 and/or reed stop (82, 84, 90, 92, and 94)

Figure 6:
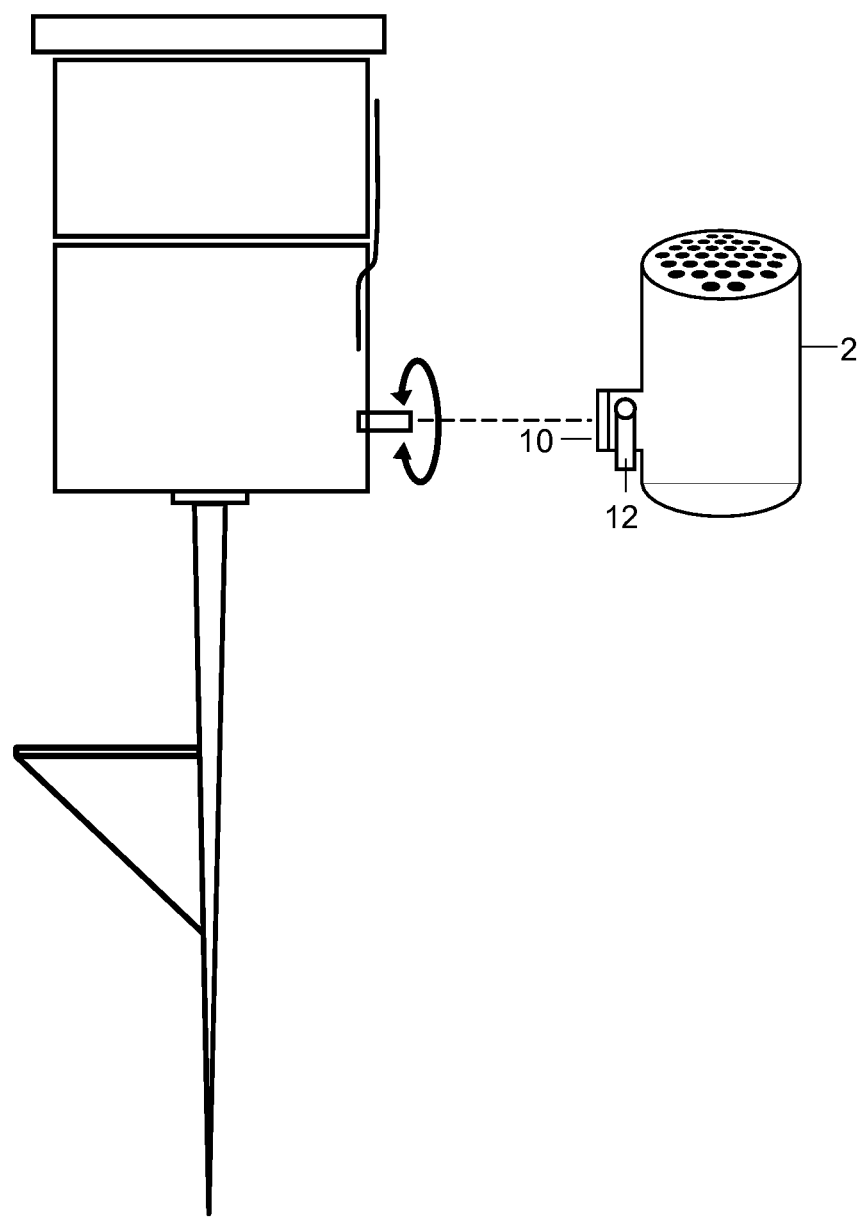
FIG. 6 illustrates the attachment of the Deer Buck Grunt Call to a device that automatically activates production of the buck grunt call noise.
Figure 7:
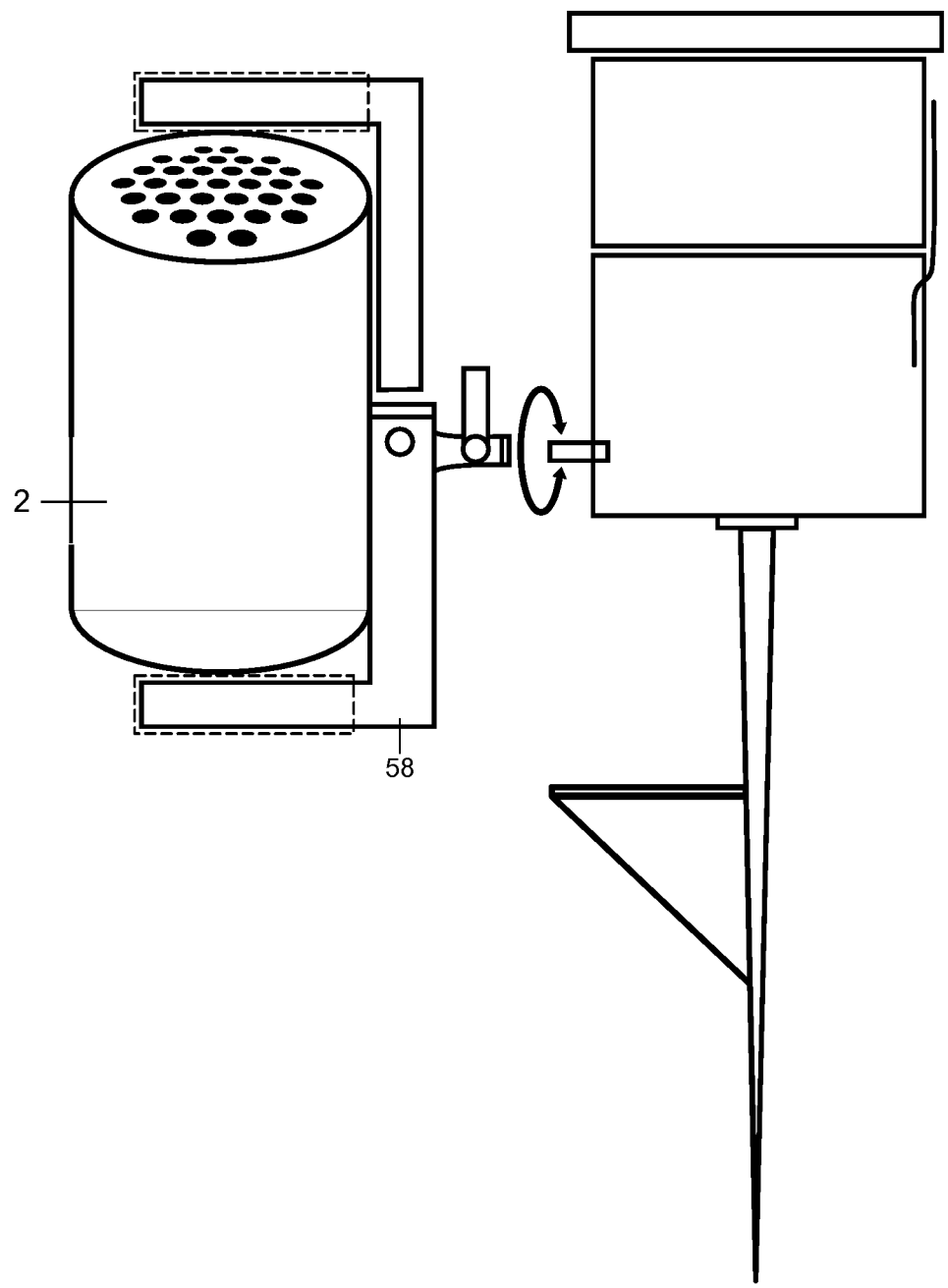
FIG. 7 shows the Deer Buck Grunt Call being attached to an alternate embodiment of a device that automatically activates production of the buck grunt noise.

The invention herein can be manipulated by a user holding inverting the position of the Deer Buck Grunt Call or the device may be attached to a robotic, mechanical remote operation device. FIG. 6 depicts the Deer Buck Grunt Call attached to a robotic, mechanical remote operation device via arm 10. FIG. 7 illustrates the Deer Buck Grunt Call body 2 lacking arm 10 being clamped onto a robotic, mechanical remote operation device via clamping arm 58.

Having thus described our invention, and the manner of its use, it should be apparent to one of average skill in the arts that incidental changes may be made thereto that fairly fall within the scope of the following appended claims, wherein I claim:

1. A game call that produces an animal noise comprising:
   an outer cylindrical body that houses an animal noise mechanism,
      wherein said outer cylindrical body includes two flat circular ends connected by a flat cylindrical ring, and one of said flat circular ends includes at least one hole for emitting an animal noise produced by said animal noise mechanism; and
   an inner animal noise mechanism,
      wherein said animal noise mechanism comprises:
         an inner cylindrical bag that reversible stores air to be emitted as an animal noise, wherein said inner cylindrical bag is closed at one end and attached to a circular member containing a cavity that allows air to enter and exit said inner cylindrical bag; wherein said circular member further includes a reed member and a reed stop member, air exiting said inner cylindrical bag passes over said reed member causing it to contact said reed stop member thereby producing said animal noise, wherein air exits said inner cylindrical bag when the outer cylindrical body is inverted.

2. The device of claim 1 wherein said outer cylindrical body includes a member to attach said device to a game call holder.

3. The device of claim 1 wherein said outer cylindrical body is composed of acrylonitrile butadiene styrene.

4. The device of claim 1 wherein said inner cylindrical bag is composed of flashspun high-density polyethylene fibers.

5. The device of claim 1 wherein said reed member is composed of wood.

6. The device of claim 1 wherein said reed member is composed of duralar.

* * * * *